(12) United States Patent
Epling

(10) Patent No.: US 11,127,172 B2
(45) Date of Patent: Sep. 21, 2021

(54) INFINITELY LAYERED CAMOUFLAGE

(71) Applicant: J. Patrick Epling, Murfreesboro, TN (US)

(72) Inventor: J. Patrick Epling, Murfreesboro, TN (US)

(*) Notice: Subject to any disclaimer, the term of this patent is extended or adjusted under 35 U.S.C. 154(b) by 0 days.

(21) Appl. No.: 16/450,642

(22) Filed: Jun. 24, 2019

(65) Prior Publication Data
US 2020/0402269 A1    Dec. 24, 2020

(51) Int. Cl.
G06T 11/00 (2006.01)
G06K 9/46 (2006.01)
F41H 3/00 (2006.01)

(52) U.S. Cl.
CPC ............ G06T 11/001 (2013.01); F41H 3/00 (2013.01); G06K 9/4652 (2013.01); G06T 2200/32 (2013.01)

(58) Field of Classification Search
CPC ........ G06T 11/001; G06T 19/00; G06T 19/20
See application file for complete search history.

(56) References Cited

U.S. PATENT DOCUMENTS

| | | | |
|---|---|---|---|
| 5,652,963 A * | 8/1997 | Davison | A61F 9/027 2/206 |
| 9,208,398 B2 | 12/2015 | Rosswog | |
| 9,322,620 B2 | 4/2016 | Maloney | |
| 9,631,900 B1 | 4/2017 | McIntosh | |
| 9,746,288 B1 | 8/2017 | McIntosh | |
| 9,835,415 B2 | 12/2017 | Kirkpatrick | |
| 9,920,464 B2 | 3/2018 | Moon | |
| 9,952,020 B2 | 4/2018 | Schwarz | |
| 2004/0017385 A1* | 1/2004 | Cosman | G06T 17/05 345/629 |
| 2006/0244907 A1* | 11/2006 | Simmons | G02B 27/46 351/159.26 |
| 2008/0079719 A1* | 4/2008 | Woo | G06T 15/30 345/419 |
| 2011/0316978 A1* | 12/2011 | Dillon | G01B 11/2513 348/46 |
| 2012/0069197 A1* | 3/2012 | Maloney | H04N 1/6086 348/207.1 |
| 2015/0116321 A1* | 4/2015 | Fortner | F41H 3/00 345/420 |
| 2015/0154745 A1* | 6/2015 | Lafon | G06T 19/00 382/106 |
| 2020/0170760 A1* | 6/2020 | Dawood | G06K 9/00214 |

FOREIGN PATENT DOCUMENTS

CN    106052816 A  * 10/2016

* cited by examiner

*Primary Examiner* — Todd Buttram
(74) *Attorney, Agent, or Firm* — Mark A. Pitchford; Eric B. Fugett; Pitchford Fugett, PLLC

(57) ABSTRACT

A camouflage pattern is provided that appears to have infinite focus and depth of field even at 100 percent size for the elements in the camouflage pattern. Generally, three-dimensional (3D) models of elements to be used in the camouflage pattern are captured or generated. The models are then arranged in a scene with a background (e.g., an infinite background) via 3D graphics editing programs such as is used to render computer generated graphics in video games and movies. A two-dimensional (2D) capture of the scene thus shows all visible surfaces of the elements in the scene in focus at all depths of field. The elements may or may not be shaded by one another from the perspective of the image capture location in the 3D environment.

15 Claims, 3 Drawing Sheets

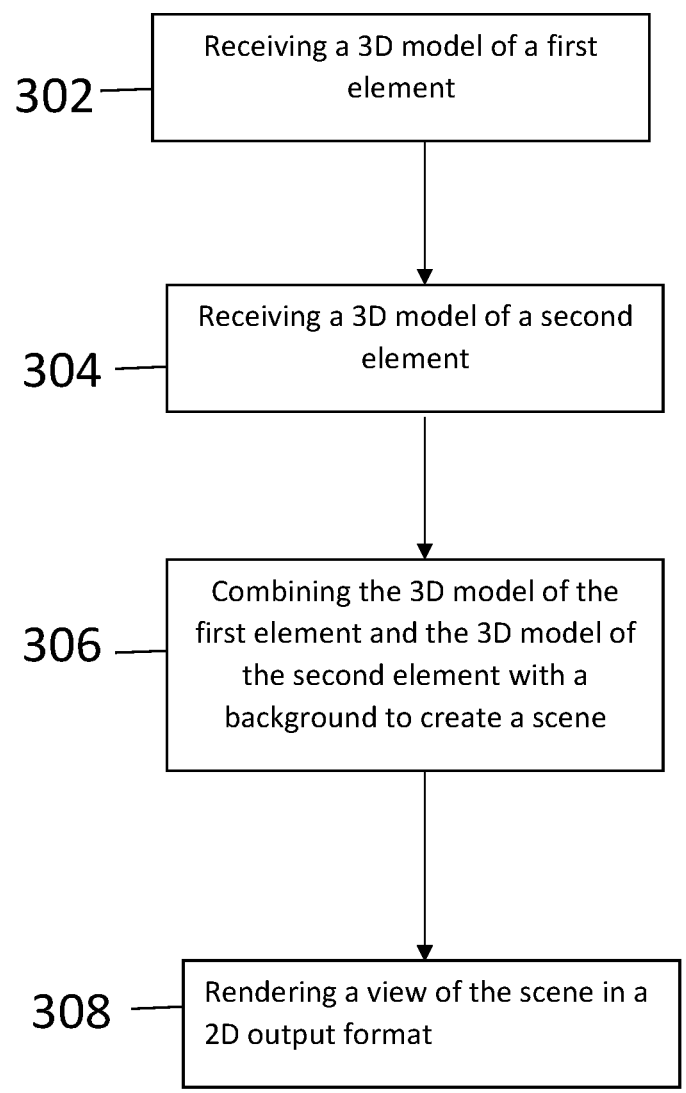

INFINITELY LAYERED CAMOUFLAGE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to camouflaging objects by applying a camouflage pattern to them via printing, wrapping, or covering. More particularly, this invention pertains to generating camouflage patterns.

Current camouflage patterns are generated by capturing images of an environment from a given perspective (e.g., over reed grasses in a duck pond) and repeating that image to generate a never-ending camouflage pattern. The captures images may be edited such as by making irregular or stitching them one to the next to generate the repeating image such that breaks between repeating edges are not obvious to an ordinary observer of the pattern (or to wildlife viewing the pattern). Alternatively, the repeating image may be synthesized. That is, images of elements (e.g., a group of reeds, a clump of grasses, a cattail, etc.) in the environment may be taken, stitched together, and overlaid onto a background to generate the image used as the repeating image in the never-ending camouflage pattern. Examples of varying versions of these techniques may be found in U.S. Pat. Nos. 9,208,398; 9,322,620; 9,631,900; 9,746,288; 9,835,415; 9,920,464; and 9,952,020.

These image-based techniques appear flat. That is, overhead images of a duck blind look like overhead images of a duck blind that lack depth of field because the focal length of the camera cannot extend through the field depth of the captured image due to physical limitations of camera sensor size and aperture size. Piecing elements onto a background overcomes some of the depth of field issues because multiple images at different focal points of the elements in the environment may be stitched together in 2-dimensional (2D) image editing software to use the in-focus portion of each of the images representing the element or object. For example, 5-10 close up images of a stick at varying focal lengths or points may be stitched together to represent a 6 inch diameter stick about a foot long. Thus, only 5-10 layers, points, or surfaces on the stick are actually in focus, and there may be even fewer layers (e.g., 1 or 2) in focus for smaller elements such as leaves. The composite image of the element is generally shrunk by about 50 percent before being added to the camouflage pattern's repeating image which also forces the element to appear more universally focused (i.e., having more layers than it actually does) to an observer. However, at 100 percent size, the lack of focus throughout the object and pattern, particularly at different depths of field in the image, becomes evident to many observers and may begin to be noticed by wildlife.

BRIEF SUMMARY OF THE INVENTION

Aspects of the present invention provide a camouflage pattern appearing to have infinite focus and depth of field even at 100 percent size for the elements in the camouflage pattern. Generally, three-dimensional (3D) models of elements to be used in the camouflage pattern are captured or generated. The models are then arranged in a scene with a background (e.g., an infinite background) via 3D graphics editing programs such as is used to render computer generated graphics in video games and movies. A 2D capture of the scene thus shows all visible surfaces of the elements in the scene in focus at all depths of field. The elements may or may not be shaded by one another from the perspective of the captured image in the 3D environment.

In one aspect, a method of making a camouflage pattern includes receiving a three-dimensional model of a first element. The three-dimensional model of the first element is combined with a background to create a scene. A view of the scene is rendered in a two-dimensional output format. The rendered view of the scene and the two-dimensional output format is the camouflage pattern.

In another aspect, and object has a camouflage pattern thereon or a surface thereof. The camouflage pattern includes a background and a first element. All visible surfaces at every depth of the first element are in focus.

In another aspect, a non-transitory computer readable medium has computer executable instructions stored thereon representative of an image file. The image file is representative of a camouflage pattern including a background and a first element. All visible surfaces at every depth of the first element are in focus when the camouflage pattern is rendered.

BRIEF DESCRIPTION OF THE SEVERAL VIEWS OF THE DRAWINGS

FIG. 3 is a flow chart of a method of creating an infinitely layered camouflage pattern.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

Figure 1:
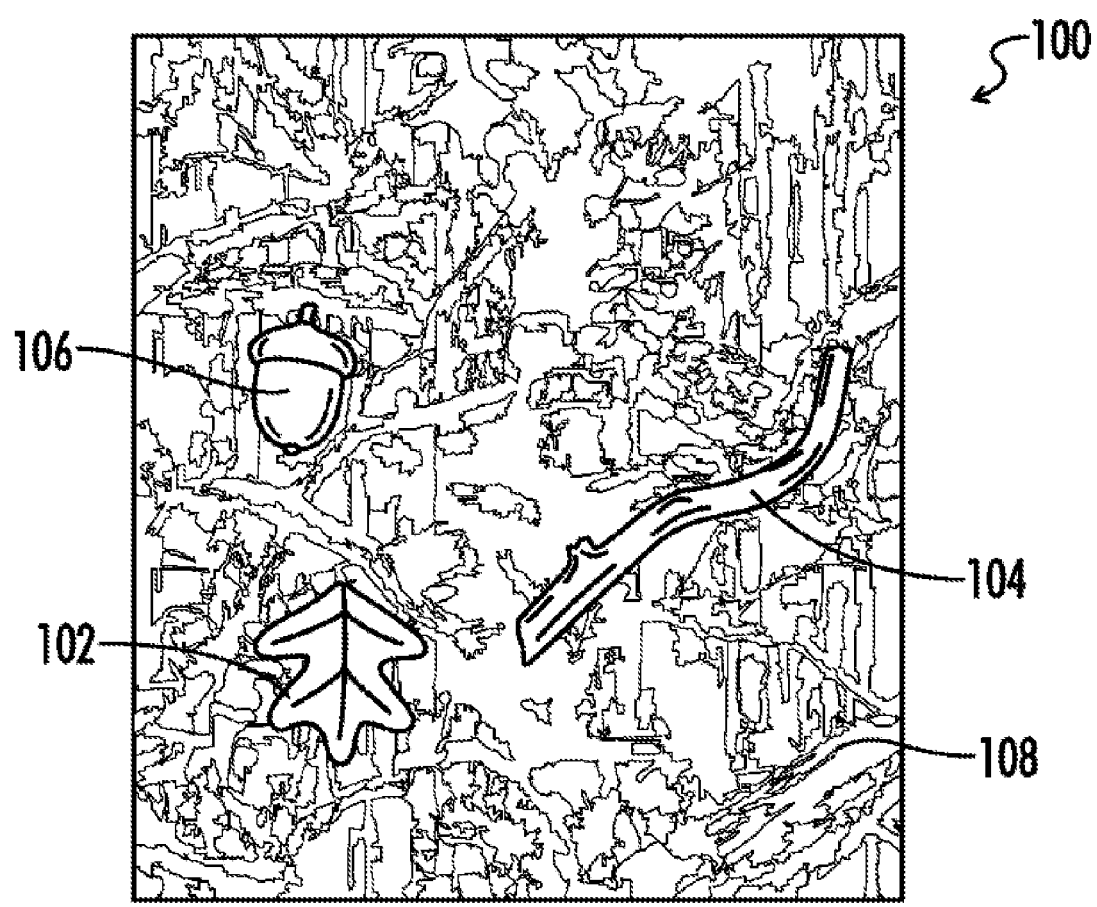
FIG. 1 is a plan view of a segment of a camouflage pattern (irregular edges or outline of the pattern not shown).

Referring to FIG. 1, a pattern 100 includes a plurality of major elements. The pattern 100 may be, for example, a camouflage pattern such as Mossy Oak Breakup. The pattern 100 includes a first major element 102, a second major element 104, and a third major element 106. The pattern 100 may include a background 108 within which the major elements 102, 104, and 106 reside and blend into. In the example of Mossy Oak Breakup® camouflage, major elements may include, for example, leaves, branches, acorns, sticks, reeds, grass, or dirt. The background 108 may be, for example, tree bark or a leaf covered ground, or may be an artificially created three-dimensional (3D) infinite background (typically including dirt, tree bark, leaves, snow, moss, etc. and/or patches of similar colors).

Figure 2:
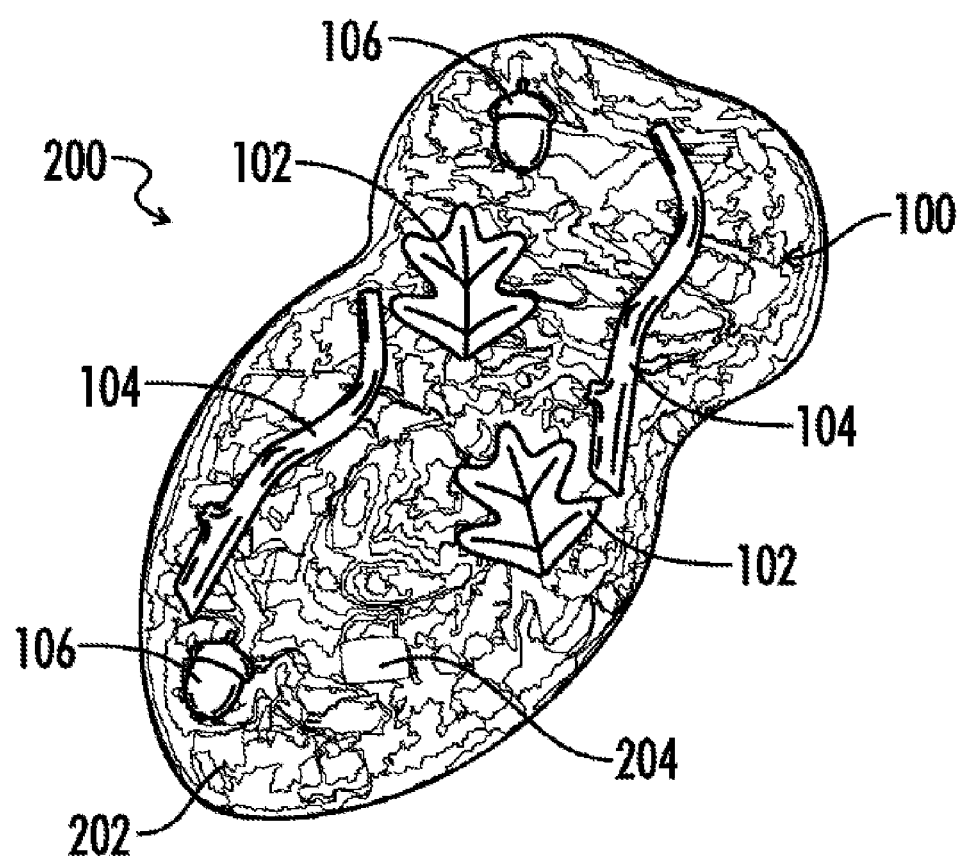
FIG. 2. is an isometric view of an object having the camouflage pattern of FIG. 1 thereon.

Referring to FIG. 2, an object 200 has a surface 202 to which the pattern 100 has been applied via dip transfer printing, vinyl wrap, or direct printing. Application of the camouflage pattern 100 to the surface 202 of the object 200 is shown leaving a void 204, which sometimes occurs with the dip transfer process. Various methods of repairing voids are known in the art. In one embodiment, the camouflage pattern 100 is repeated on the object 200, and the camouflage pattern 100 has an irregular outline or parameter. That is, the outline of the camouflage pattern 100 is not rectangular, but instead includes protrusions and recesses configured to interlock with one another when the image forming the camouflage pattern 100 is repeated. In one embodiment, the camouflage pattern 100 includes a plurality of elements (102, 104, and 1 of 6), and every visible surface of each of the plurality of elements at every depth of each element is in focus.

Referring to FIG. 3, a method of making a camouflage pattern 300 begins with receiving a 3D model of a first element 102 at 302. Optionally, a 3D model of a second element 104 is received at 304. In one embodiment, receiving the 3D model of the first element 102 includes capturing a point cloud representative of the first element 102 and calculating a wire mesh model of the first element 102 from the captured point cloud. This may be accomplished via a 3D scanner such as the SMARTTECH 3D Micron3D color 24 Mpix scanner. In one embodiment, capturing the point cloud representative of the first element 102 includes using a shadowless or shadeless capture system.

The 3D model of the first element 102 and the 3D model of the second element 104 are combined with a background 108 at 306 to create a scene.

At 308, a view of the scene is rendered in a two-dimensional output format to generate the camouflage pattern 100. In one embodiment, rendering the view of the scene includes rendering all visible surfaces of the 3D model of the first element 102 in focus. That is, all visible surfaces of the 3D model of the first element are rendered with a depth of field exceeding a depth of the 3D model of the first element 102. In one embodiment, receiving the 3D model of the first element 102 includes capturing surfaces of the first element 102 that do not appear in the camouflage pattern 100 (because they are not visible from the viewing perspective of the 3D scene rendered in the 2D output format). In one embodiment, the method 300 further includes printing the rendered view of the scene on a dip transfer film, a fabric, or a vinyl wrap.

Utilizing a 3D scanner to generate a wire mesh model of the first element 102 (and other elements 104, 106) results in a 3D model of the first element 102 wherein every point on the 3D model is in focus, therefore, a camouflage pattern 100 generated based on the 3D model of the first element 102 and an infinite background 108 results in a camouflage pattern having an unlimited or infinite number of layers. Practically speaking, each pixel of the camouflage pattern 100 is its own layer because every point within the 3D model may be a different distance from the point of capture (i.e., camera perspective or view), but every point is kept in focus.

Although shown herein (e.g., at FIG. 1) with elements (102, 104, and 106) separated from one another, it is contemplated within the scope of the claims that the elements (102, 104, and 106) may overlap one another, repeat within the two-dimensional image forming the camouflage pattern 100, and appear at different distances from the point of capture or viewpoint of the three-dimensional scene upon which the two-dimensional view forming the camouflage pattern 100 is based. Additionally, shadowing within the three-dimensional scene may be eliminated, provided from the point of view of capture of the three-dimensional scene, or determined from a light source location different from the point of capture (i.e., viewpoint) of the three-dimensional scene.

In one embodiment, a non-transitory computer readable medium has computer executable instructions stored thereon representative of an image file. The image file is representative of the camouflage pattern 100. The camouflage pattern 100 includes a background and a first element. All visible surfaces at every depth of the first element are in focus when the camouflage pattern is rendered from the image file.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful INFINITELY LAYERED CAMOUFLAGE, it is not intended that such references be construed as limitations upon the scope of this invention except as set forth in the following claims.

What is claimed is:

1. A method of making a camouflage pattern, said method comprising:
    receiving a three-dimensional (3D) model of a first element, wherein:
        the 3D model is a point cloud representative of the first element or a wire mesh of the first element generated from the point cloud, and
        the first element is one of a leaf, branch, acorn, stock, reed, or grass;
    combining the 3D model of the first element with a background to create a scene; and
    rendering a view of the scene in a two-dimensional (2D) output format, wherein:
        the rendered view of the scene in the 2D output format is the camouflage pattern;
        all visible surfaces of the 3D model of the first element at all distances from a point of capture of the view of the scene are in focus;
        the background is an infinite background; and
        receiving the 3D model of the first element comprises capturing surfaces of the first element that do not appear in the camouflage pattern because the 3D model comprises surfaces not visible from the perspective of the rendered view of the scene.

2. The method of claim 1, further comprising printing the rendered view of the scene on a dip transfer film, a fabric, or a vinyl wrap.

3. The method of claim 1, wherein rendering the view of the scene comprises rendering the visible surfaces of the 3D model of the first element with a depth of field exceeding a depth of the 3D model of the first element.

4. The method of claim 1, further comprising:
receiving a 3D model of a second element, wherein:
the background is a 3D background;
said combining comprises placing the 3D model of the first element and the 3D model of the second element within the 3D background to create the scene; and
said rendering a view of the scene comprises rendering the view of the scene in a two-dimensional (2D) output format, wherein the rendered view of the scene in the 2D output format is the camouflage pattern.

5. The method of claim 1, wherein receiving the 3D model of the first element comprises:
capturing the point cloud representative of the first element; and
calculating the wire mesh of the first element from the captured point cloud.

6. The method of claim 1, wherein receiving the 3D model of the first element comprises:
capturing a point cloud representative of the first element using a shadowless capture system; and
calculating a wire mesh of the first element from the captured point cloud.

7. The method of claim 1, wherein the background is a 3D background having infinite depth.

8. The method of claim 1, wherein:
the view of the scene comprises a second element overlapping the first element such that the first and second elements are at different distances from a viewpoint of the view of the three-dimensional scene, and
all visible surfaces of the second element are in focus.

9. An object having a camouflage pattern thereon, said camouflage pattern comprising:
a background, wherein the background is an infinite background; and
a first element, wherein:
all visible surfaces at every depth of the first element are in focus,
the first element is generated from a captured point cloud representative of the first element,
the first element is one of a leaf, branch, acorn, stock, reed, or grass.

10. The object of claim 9, wherein the object is a dip transfer film, fabric, or vinyl wrap.

11. The object of claim 9, wherein the camouflage pattern is repeated on the object, and the camouflage pattern has an irregular outline.

12. The object of claim 9, wherein the camouflage pattern further comprises a plurality of elements and every visible surface of each of the plurality of elements at every depth of each element is in focus.

13. A non-transitory computer readable medium having computer executable instructions stored thereon representative of an image file, said image file representative of a camouflage pattern, said camouflage pattern comprising:
a background; and
a first element, wherein:
the image file is a rendering of a two-dimensional (2D) view of a three-dimensional (3D) scene comprising the first element and the background;
the 3D scene comprises a 3D model of the first element comprises capturing surfaces of the first element that do not appear in the camouflage pattern because the 3D model comprises surfaces not visible from the perspective of the rendered view of the scene;
all visible surfaces at every depth of the first element from a point of capture of the view of the scene are in focus when the camouflage pattern is rendered,
the first element is generated from a point cloud representative of the first element, and
the first element is one of a leaf, branch, acorn, stock, reed, or grass.

14. The non-transitory computer readable medium of claim 13, wherein the background is an infinite background.

15. The non-transitory computer readable medium of claim 13, wherein the first element is one element of a plurality of elements represented by respective 3D models in the scene, and the camouflage pattern further comprises the plurality of elements and every visible surface of each of the plurality of elements at every depth of each element is in focus when the camouflage pattern is repeated.

* * * * *